United States Patent
Schubert et al.

(10) Patent No.: US 8,786,152 B2
(45) Date of Patent: Jul. 22, 2014

(54) SAFETY BEARING FOR RETAINING A ROTOR SHAFT OF A MACHINE

(75) Inventors: Gunnar Schubert, Birkenwerder (DE); Hartmut Walter, Berlin (DE); Daniel Zülow, Berlin (DE)

(73) Assignee: Siemens Aktiengesellschaft, München (DE)

( * ) Notice: Subject to any disclaimer, the term of this patent is extended or adjusted under 35 U.S.C. 154(b) by 198 days.

(21) Appl. No.: 13/382,742

(22) PCT Filed: Jun. 28, 2010

(86) PCT No.: PCT/EP2010/059117
§ 371 (c)(1),
(2), (4) Date: Mar. 23, 2012

(87) PCT Pub. No.: WO2011/003759
PCT Pub. Date: Jan. 13, 2011

(65) Prior Publication Data
US 2012/0181887 A1    Jul. 19, 2012

(30) Foreign Application Priority Data
Jul. 6, 2009  (DE) .................. 10 2009 031 887

(51) Int. Cl.
*H02K 5/16* (2006.01)
*H02K 7/08* (2006.01)

(52) U.S. Cl.
USPC ............................................ 310/90; 384/582

(58) Field of Classification Search
CPC ............................ H02K 5/1672; F16C 33/107
USPC .................................................. 310/90, 90.5
See application file for complete search history.

(56) References Cited

U.S. PATENT DOCUMENTS

| 4,334,718 | A |   | 6/1982 | Hirt et al. |
|---|---|---|---|---|
| 5,021,697 | A |   | 6/1991 | Kralick |
| 5,752,774 | A | * | 5/1998 | Heshmat et al. ............. 384/549 |
| 7,952,247 | B2 |   | 5/2011 | Menz et al. |
| 8,063,525 | B2 |   | 11/2011 | Petereit et al. |
| 2004/0240759 | A1 | * | 12/2004 | Swann et al. ................. 384/309 |
| 2005/0200219 | A1 | * | 9/2005 | Brunken, Jr. ................. 310/90.5 |
| 2008/0253710 | A1 | * | 10/2008 | Dodoro et al. ................ 384/548 |
| 2009/0091203 | A1 | * | 4/2009 | Petereit et al. .................. 310/90 |

FOREIGN PATENT DOCUMENTS

| DE | 2711065 A1 | 9/1978 |
|---|---|---|
| DE | 102004024206 B4 | 4/2006 |
| DE | 60209752 T2 | 11/2006 |
| DE | 102006017933 A1 | 10/2007 |
| DE | 102006019873 B3 | 10/2007 |
| JP | 11101236 A | 4/1999 |
| WO | WO 03038973 A1 | 5/2003 |

* cited by examiner

*Primary Examiner* — Terrance Kenerly
(74) *Attorney, Agent, or Firm* — Feiereisen LLC

(57) ABSTRACT

The invention relates to a safety bearing for retaining a rotor shaft (4) of a machine (1), wherein the safety bearing (2) comprises a first carrier body (7) rotating about a virtual geometric center line (M) and roller bodies (5), wherein each roller body comprises a region (19) that is located between the center line (M) and the first carrier body (7), wherein the roller bodies (5) are each connected in a rotatable manner to the first carrier body (7) via a shaft (6). The invention creates a safety bearing (2) with which the likelihood of an occurrence of a backward-whirl is considerably reduced as compared to the safety bearings known from the prior art.

11 Claims, 3 Drawing Sheets

SAFETY BEARING FOR RETAINING A ROTOR SHAFT OF A MACHINE

CROSS-REFERENCES TO RELATED APPLICATIONS

This application is the U.S. National Stage of International Application No. PCT/EP2010/059117, filed Jun. 28, 2010, which designated the United States and has been published as International Publication No. WO 2011/003759 and which claims the priority of German Patent Application, Serial No. 10 2009 031 887.9, filed Jul. 6, 2009, pursuant to 35 U.S.C. 119(a)-(d).

BACKGROUND OF THE INVENTION

The invention relates to a safety bearing for retaining a rotor shaft of a machine.

Magnetic bearings are increasingly used nowadays for mounting rotating rotor shafts of machines during operation, said magnetic bearings maintaining the rotating rotor shaft in a floating state with the aid of magnetic fields. In the event that the magnetic bearing fails, e.g. as the result of a power failure, the rotor shaft falls into a safety bearing and is retained thereby. A safety bearing therefore serves to retain the rotor shaft. The safety bearing temporarily takes over as the mounting of the rotor shaft until the rotor shaft is at a complete standstill. Safety bearings must firstly withstand the shock when the rotating rotor shaft falls into the safety bearing and, secondly, ensure safe running down of the rotor shaft in the safety bearing. For this purpose, the safety bearing has a slightly larger internal diameter compared with the rotor shaft diameter so that, during normal operation, that is, with the magnetic bearing active, the rotor shaft does not touch the safety bearing. Usually, the safety bearing is accommodated in the machine carcass in the region of the respective end of the rotor shaft.

Safety bearings must firstly withstand the shock when the rotating rotor shaft falls into the safety bearing and, secondly, ensure safe running down of the rotor shaft in the safety bearing. For this purpose, certain frictional characteristics and kinematic conditions must be met. Excessively high friction between the sliding or rolling components would lead within a very short time to severe heating and thus to a short service life of the safety bearing. This has the result that running down of the rotor shaft in the safety bearings without braking is not possible in most cases. Therefore, for the safe operation of machines in which the rotor shaft is mounted with magnetic bearings, braking devices must generally be provided for decelerating the rotor shaft.

If a magnetic bearing fails, the rotor shaft falls, as stated above, into the safety bearing. The danger exists herein that the rotor shaft performs a "backward whirl", rolling along the inner surface of the safety bearing. By contrast to rotationally synchronous rotor motion wherein the rotor deflection takes place synchronously with the circulating imbalance excitation, in the case of a backward whirl, the rotor shaft performs the orbit in the reverse direction to the rotor shaft rotation with a very large amplitude. A portion that is rotationally synchronous and has a much smaller amplitude is overlaid, so that an elliptical orbit is produced.

The conditions for the occurrence of a backward whirl are manifold. The occurrence of backward whirl generally leads, due to the very large forces involved, to disruption or damage of the machine.

The use of roller bearings as safety bearings is known from the prior art. The outer ring of a roller bearing is connected to the bearing end plate. The inner diameter of the inner ring of the safety bearing is somewhat larger than the outer diameter of the rotor shaft. During a crash, the rotor shaft falls into the inner ring so that the inner ring and the rolling bodies are accelerated after a very short time and the rotor shaft runs down. A safety bearing based on a roller bearing is, firstly, unsuitable for large rotor weights and, secondly, the danger of backward whirl exists.

Furthermore, the use of dry sliding bearings as safety bearings is known. The rotor shaft falls directly into a fixed ring which comprises individual coated bearing shells, and runs down there. Given unfavorable frictional characteristics, the rotor shaft is able to enter into backward whirl.

Previously, attempts were made, using complex proofs based on calculations and experiments, to show that backward whirl does not occur in the aforementioned known safety bearings, taking account of all the known framework conditions. This type of procedure is time-consuming and costly.

It is an object of the invention to provide a safety bearing in which the probability of backward whirl occurring is greatly reduced compared with safety bearings from the prior art.

This aim is achieved with a safety bearing for retaining a rotor shaft of a machine wherein the safety bearing has a first carrier body rotating about a virtual geometrical central axis, and rolling bodies, the rolling bodies each having a region which is arranged between the central axis and the first carrier body, the rolling bodies each being rotatably connected to the first carrier body via a shaft.

Advantageous embodiments of the invention are disclosed in the dependent claims.

It has proved to be advantageous if the rolling bodies are configured as rollers. Rollers are a common configuration of the rolling bodies and are particularly easy and economical to manufacture.

It has also proved to be advantageous if the first carrier body is configured as a ring, since a ring has a form that is particularly mechanically stable.

It has also proved to be advantageous if the rolling bodies are arranged evenly distributed round the periphery of the first carrier body, since a backward whirl can then be particularly reliably prevented.

It has also proved to be advantageous if the rolling bodies are each rotatably connected via a shaft and at least one roller bearing to the first carrier body, since then a particularly low coefficient of friction is achieved.

It has also proved to be advantageous if the safety bearing has a second carrier body arranged round the first carrier body, elastic elements being arranged between the first carrier body and the second carrier body. By this means, the shock loading acting on the rolling bodies and the roller bearings in the event of a crash of the rotor shaft into the safety bearing is reduced.

It has also proved to be advantageous if the second carrier body is configured as a ring, since a ring has a mechanically particularly stable form.

It has also proved to be advantageous if the elastic elements are configured as spring damping elements or as damping elements. The configurations of the elastic elements given above are common configurations of the elastic elements.

It has also proved to be advantageous if the elastic elements are arranged, relative to the virtual geometrical central axis, radially aligned with the rolling bodies.

It has also provided to be advantageous if the elastic elements are arranged offset in a tangential direction from the rolling bodies. This provides a particularly simple overall arrangement.

It has also proved to be advantageous to configure a machine with safety bearings according to the invention. Here, the machine preferably has a magnetic bearing for operational mounting of the rotor shaft.

It has also proved to be advantageous to configure a machine having the safety bearing according to the invention. The machine preferably has a magnetic bearing for operational mounting of the rotor shaft. The machine can be configured, for example, as an electric motor or a generator or a compressor or a condenser or as a turbine. The machine can particularly be configured as a wind power generator.

BRIEF DESCRIPTION OF THE DRAWING

Two exemplary embodiments of the invention are illustrated in the drawings and will now be described in greater detail, making reference to the drawings, in which.

DETAILED DESCRIPTION OF PREFERRED EMBODIMENTS

Figure 1:
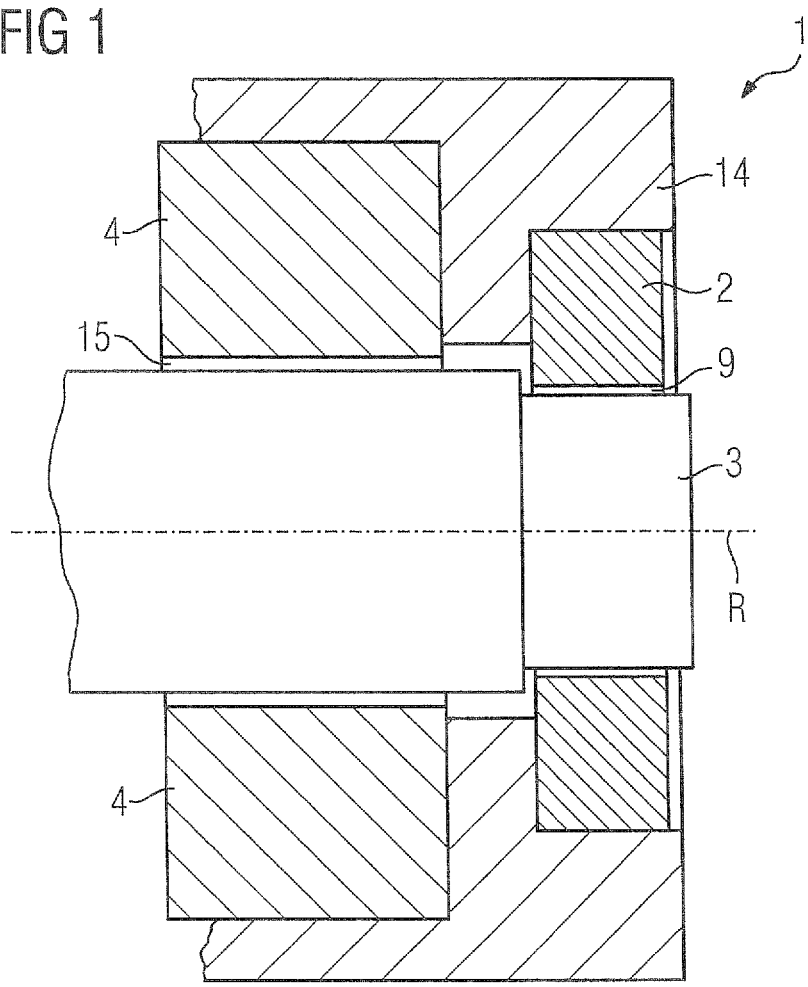
FIG. 1 is a schematic representation of a machine which has a safety bearing according to the invention.

FIG. 1 shows, in the form of a schematic representation, the elements of a machine 1 that are essential to an understanding of the invention, configured, in the context of the exemplary embodiment, as an electric motor. Other elements of the machine, such as the rotor yoke, that are not essential to an understanding of the invention are not shown in FIG. 1 for the sake of clarity. The machine 1 has a rotatable rotor shaft 3 mounted with a magnetic bearing 4, said shaft rotating, during operation of the machine, about a virtual geometrical rotation axis R.

A magnetic bearing 4 holds the rotor shaft 1 suspended with a regulated magnetic field in an air gap 15. For this purpose, the magnetic bearing 4 has coils as essential elements for generating the magnetic field.

Aside from the magnetic bearing 4, the machine 1 comprises a safety bearing 2 which retains the rotor shaft 1 in the event of a failure of the magnetic bearing 4, when said shaft falls into the safety bearing 2, which then takes over the mounting of the rotor shaft 3 until the rotor shaft 3 comes to a standstill. Such a failure of the magnetic bearing 4 can occur, for example, if the current to the machine 1, and therefore to the magnetic bearing 4, fails. It should be noted at this point that the safety bearing 2 and the magnetic bearing 4 are shown purely symbolically in the schematic sectional view in FIG. 1, in the form of rectangles.

The machine 1 also has a stationary machine housing 14 to which the safety bearing 2 is fastened, wherein the fastening between the safety bearing 2 and the machine housing 14 is not shown in FIG. 1 for the sake of clarity.

Arranged between the safety bearing 2 and the rotor shaft 3 is an air gap 9. With the magnetic bearing 4 switched on and functioning correctly, the safety bearing 2 has no contact with the rotor shaft 3. In the event of a failure of the magnetic bearing 4, for example, as the result of a power failure, the rotor shaft 3 falls into the safety bearing and mechanical contact takes place between the rolling bodies of the safety bearing according to the invention (see FIG. 2 and FIG. 3) and the rotor shaft 3 rotating in particular, rapidly rotating, during operation of the machine 1.

Figure 2:
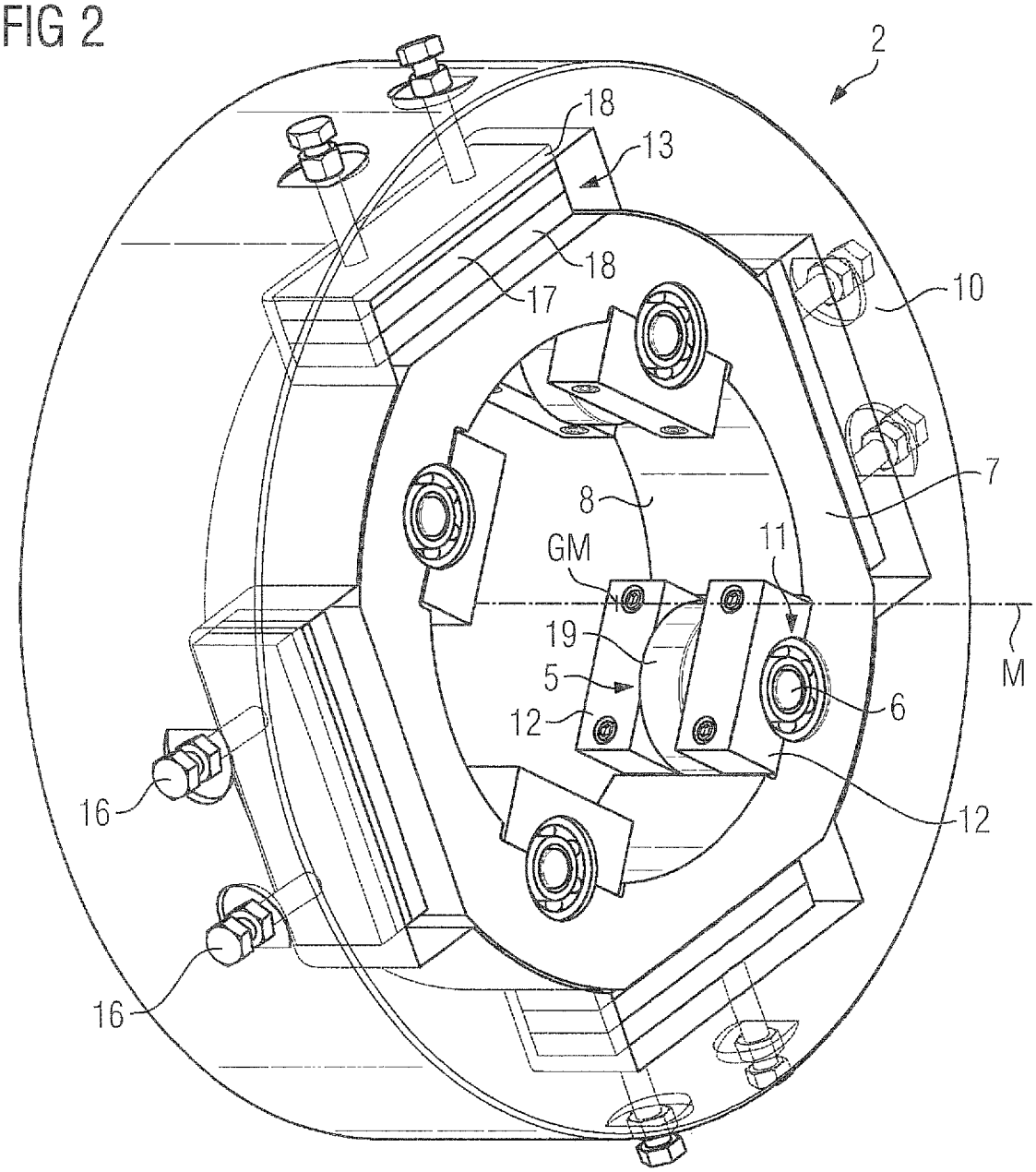
FIG. 2 is a perspective representation of the safety bearing according to the invention in the context of a first embodiment of the invention.

FIG. 2 shows the safety bearing according to the invention in the form of a perspective, partially transparent, representation of a first embodiment of the invention.

The safety bearing 2 according to the invention has a first carrier body 7 and rolling bodies surrounding a virtual geometric central axis M, wherein, for clarity, only one rolling body 5 is provided with a reference sign. The central axis M extends through the geometric centre GM of the first carrier body 7. In the first exemplary embodiment, the first carrier body 7 is configured as a ring. However, the first carrier body can also have a different geometrical form about the central axis M, for example, a square form. The rolling bodies have a region 19 which is arranged between the central axis M and the first carrier body 7. In this exemplary embodiment, the individual rolling bodies are firmly connected to an associated, preferably rod-shaped shaft (mechanical axle), wherein for the sake of clarity, only one shaft 6 is provided with a reference sign. The shaft 6 preferably is connected, rotatable via roller bearings 11, to the interior side 8 of the first carrier body 7. The roller bearings 11 are preferably arranged at both ends of the shaft 6 and fastened by means of holding devices 12 to the interior side 8 of the first carrier body 7. In the exemplary embodiment, therefore, the interior side 8 of the first carrier body 7 is provided with recesses. The individual rolling bodies are therefore each rotatably connected via an associated shaft to the first carrier body 7. It should be noted at this point that alternatively, the individual rolling bodies can also be rotatably connected via respectively assigned, preferably rod-shaped shafts, to the first carrier body 7 in that the respective shaft is firmly connected to the first carrier body 7 and the respective rolling body is connected, e.g. via a roller bearing, to the shaft.

In the context of the exemplary embodiment, the rolling bodies are configured as rollers, wherein the rolling bodies are arranged evenly distributed round the periphery of the first carrier body. In the first exemplary embodiment, therefore, the rolling bodies are arranged evenly spaced round the periphery of the first carrier body.

If the rotor shaft 3 falls into the safety bearing 2, said shaft comes into contact with the exterior surface of the rolling bodies, so that the rolling bodies immediately begin to rotate. The invention prevents the occurrence of backward whirl by minimizing the frictional surfaces on which the rotor shaft 3 can roll during running down in the safety bearing 2. The rolling bodies have only a very small frictional area which comes into contact with the rotor shaft 3. Therefore only very little friction occurs between the safety bearing and the rotor shaft. In an advantageous embodiment of the invention, the friction is further minimized by the use of roller bearings in which the shafts are mounted. The rotor shaft 3 rolls over the exterior surface of the rolling bodies. As a result of the very low friction between the safety bearing and the rotor shaft achieved with the invention, the occurrence of backward whirl is reliably prevented.

The safety bearing according to the invention also preferably comprises a second carrier body 10 arranged round the first carrier body 7. In the exemplary embodiment, the second carrier body 10 is configured as a ring. The second carrier body can, however, also have a different geometrical form, such as a square form. Arranged between the first carrier body 7 and the second carrier body 10 in the exemplary embodiment are elastic elements and, for the sake of clarity, only one elastic element 13 is provided with a reference sign. The elastic elements can, for example, be configured in the form of spring damping elements having springing and damping properties, or in the form of damper elements (e.g. Stop-Shock dampers) which have, overwhelmingly, damping properties. The elastic elements can therefore be realized in the form of rubber elements which entirely or at least partially comprise rubber. The rubber elements, for example, as in the exemplary embodiment, can thus have a layer 17 of rubber and two layers 18 of metal, wherein the layer 17 of rubber is arranged between the two layers 18 of metal. Thus, in the exemplary embodiment, the elastic elements are configured as rubber-metal connections.

As a result of the elastic elements, the shock acting on the rolling bodies during the impact of the rotor shaft is effectively absorbed, thereby protecting the rolling bodies and the roller bearings.

In the exemplary embodiment of FIG. 2, the elastic elements are arranged offset in the tangential direction relative to the rolling bodies, which enables an overall arrangement which is structurally easy to realize. In the exemplary embodiment of FIG. 2, the elastic elements are arranged offset relative to the virtual geometric central axis M extending through the geometric center GM of the first carrier body 7 by an angle of 45° to the rolling bodies.

Figure 3:
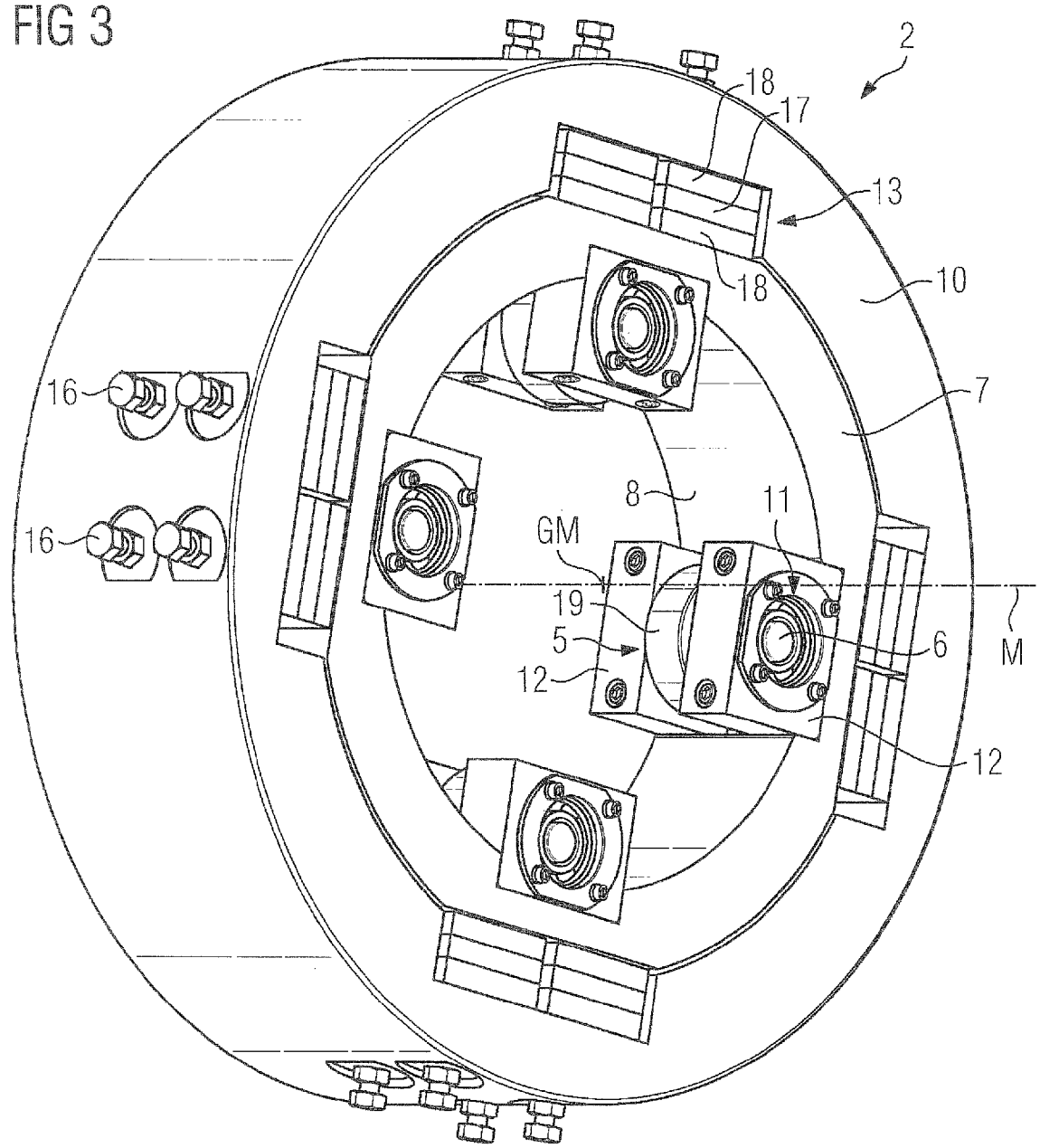
FIG. 3 is a perspective representation of the safety bearing according to the invention in the context of a second embodiment of the invention.

FIG. 3 shows a second embodiment of the invention. The basic construction of this embodiment essentially corresponds to that of FIG. 2 described above. The same elements are therefore shown in FIG. 3 with the same reference signs as in FIG. 2. The essential difference relative to the embodiment of FIG. 2 lies therein that in the embodiment of FIG. 3, the elastic elements are arranged radially aligned with the rolling bodies relative to the virtual geometrical central axis M of the first carrier body 7. The individual rolling bodies are therefore arranged in a line with the respective associated elastic elements. This embodiment has the advantage that the force acting upon the rolling bodies during impact by the rotor shaft can be particularly effectively absorbed, since the force generated by the shock is directly conducted in the radial direction into the elastic elements and therefore, for example, the rolling bodies and the roller bearings are particularly well protected and the loading thereon is particularly greatly reduced.

In the embodiment of FIG. 3, two elastic elements are assigned to each roiling body. The number of elastic elements that are used per rolling body and their configuration can be adapted to the loads impinging upon the rolling bodies and the roller bearings used for mounting the rolling bodies.

As shown in FIG. 2 and FIG. 3, the elastic elements are fastened with screws to the second carrier body 10, wherein, for the sake of clarity, only two screws 16 are identified with reference signs. It should be noted here that the elastic elements are preferably pre-tensioned in order to increase their damping effect.

The elastic elements must not necessarily be evenly distributed round the periphery of the first carrier body, as in the exemplary embodiment. Furthermore, the elastic elements can be arranged round the periphery of the first carrier body arbitrarily in relation to the rolling bodies.

Furthermore, the rolling bodies also do not necessarily have to be arranged evenly distributed round the periphery of the first carrier body, as in the exemplary embodiment.

It should also be noted at this point that, of course, more than two roller bearings per rolling body can be provided for mounting the rolling body.

It should also be noted that the safety bearing according to the invention should preferably comprise at least two rolling bodies, although naturally the safety bearing can comprise more than the four rolling bodies selected for the exemplary embodiments of FIG. 2 and FIG. 3.

The safety bearing according to the invention prevents, to a high degree of probability, the occurrence of backward whirl. Said safety bearing is suitable both for high rotary speeds and also for high rotor shaft weights. The safety bearing also has a small space requirement.

The invention claimed is:

1. A safety bearing for retaining a rotor shaft of a machine, said safety bearing comprising:
    a first carrier body rotatable about a geometrical central axis;
    a rolling body mounted on a shaft and having a region arranged between the first carrier body and the geometrical central axis;
    roller bearings respectively arranged on opposite ends of the shaft for rotatably connecting the rolling body to the first carrier body;
    a second carrier body arranged in surrounding relationship to the first carrier body; and
    an elastic element arranged between the first carrier body and the second carrier body, said elastic element including a first layer of rubber and two second layers of metal, with the first layer arranged between the two second layers.

2. The safety bearing of claim 1, wherein the first carrier body is configured as a ring.

3. The safety bearing of claim 1, wherein the rolling body is configured as a roller.

4. The safety bearing of claim 1, wherein a plurality of said rolling body is evenly distributed about a periphery of the first carrier body.

5. The safety bearing of claim 1, wherein the second carrier body is configured as a ring.

6. The safety bearing of claim 1, wherein the elastic element is radially aligned with the rolling body in relation to the geometrical central axis.

7. The safety bearing of claim 1, wherein the elastic element is arranged offset tangentially in relation to the rolling body.

8. A machine, comprising:
    a rotor shaft; and
    a safety bearing for retaining the rotor shaft, said safety bearing including a first carrier body rotatable about a geometrical central axis, a rolling body mounted on a shaft and having a region arranged between the first carrier body and the geometrical central axis, roller bearings respectively arranged on opposite ends of the shaft for rotatably connecting the rolling body to the first carrier body, a second carrier body arranged in surrounding relationship to the first carrier body, and an elastic element arranged between the first carrier body and the second carrier body, said elastic element including a first layer of rubber and two second layers of metal, with the first layer arranged between the two second layers.

9. The machine of claim 8, further comprising a magnetic bearing for an operational mounting of the rotor shaft.

10. The machine of claim 8, constructed in the form of a member selected from the group consisting of a generator, a compressor, a condenser, and a turbine.

11. The machine of claim 10, wherein the generator is constructed in the form of a wind power generator.

* * * * *